United States Patent Office 2,927,852
Patented Mar. 8, 1960

2,927,852

DURABLE BONDED MASS, PARTICULARLY BRIQUETTES, FOR USE AS METALLURGICAL FLUXES

James J. Bowden, Cortland, Ohio

No Drawing. Application October 16, 1958
Serial No. 767,508

4 Claims. (Cl. 75—53)

This invention relates to a metallurgical flux which can be physically handled and fed into the charge in the furnace without appreciable or obnoxious dust formation, and which flux is resistant to water and atmospheric disintegration. This invention particularly relates to fluxing agents possessing the aforesaid qualities for use in the basic open hearth, and the electric and the oxygen processes for the manufacture of steel and the cupola process for the manufacture of iron, which fluxing agents are characterized by the components found in the dross or waste product resulting from the melting of aluminum in contact with air in the manufacture and processing of aluminum products.

While my fluxing agent is especially suitable for use in steel manufacturing operations, in general it is capable of being used in other metallurgical operations, such as castings made in foundries in cupolas. My flux is a briquette.

Aluminum dross powder as offered for sale on the market in commercial lots exists in such finely divided condition that in mechanical operations, such as bagging, shovelling or otherwise handling there results a troublesome dust which may menace the health of the operators, particularly if masks are not worn, and definitely results in loss of the dross powder and an obnoxious deposition of the dross on surfaces in the buildings. Because of this physical property, when it is introduced into the charge in the formation of steel from pig iron and other iron-containing components by the open hearth, and electric and oxygen steel processes and iron and steel foundries cupolas and other processes employing an oxidizing gas the force of air or oxygen employed in the oxidation of carbon, silicon, phosphorus, etc., therein, results in the formation of dust. There is the economic aspect in the loss because of this of an appreciable amount of aluminum dross in this operation, which loss is estimated at from 5% to 20% the weight of the dross itself. Furthermore, because of the fine subdivision in the aluminum dross, the dusty particles tend to float in the air when these dry, finely subdivided fluxes are introduced as such into open hearth, and electric and cupola and other furnaces employing an oxidizing gas, and because of such floating, contact and attack the checkers, banks, walls, bottoms and brickwork of said furnaces.

The problem of changing finely divided materials, more particularly dry, aluminum dross, into a physical condition of greater utility as a metallurgical fluxing agent has been the subject of investigation for several years. Bowden and Suda devised a process, for which they obtained U.S. Patent No. 2,480,901, on treating this kind of flux material by making it into a thin slurry using 1–10% aqueous solution of an alkali hydroxide, water being present in the proportion of 35% to 50% by weight of the flux and the alkali hydroxide present in an amount not less than 89 lbs. per ton of aluminum dross whereby aluminum hydroxide is formed in sufficient amount to constitute an effective binding agent, then forming the resulting material into briquettes under a pressure of 500 to 30,000 lbs. per sq. in. and drying the same under an elevated temperature. There are certain disadvantages in this fluxing agent and whereas the resulting briquette has good initial strength at room temperatures, the chemical reactions which retarded the briquetting process will, after an elapse of time, again go forward, forming hydrogen, methane and ammonia. The resulting expansion shatters the briquettes and causes them to revert to the pulverulent state.

The search wherein aluminum dross is utilized and wherein it is put into the form of crush-resistant briquettes has gone on because something better was needed for commercial open-hearth and electric steel and oxygen process steel and cupola iron making operations. For there are various advantages in the use of alumina as a fluxing agent in these metallurgical processes. It exercises an important influence on the operation and control of the oxide phase of the final slag. As set out in the Jas. J. Bowden Patent No. 2,283,622 "the time required for making the heat with attendant economy of operation" is achieved by securing "in the tapping or drawn-off slag, the presence of sufficient amount of alumina to replace or inhibit an excess of iron oxide ($Fe_2O_3$) which otherwise would be present in such slag in the form of calcium ferrites"; these are converted to calcium alumina ferrites, there being lime present in the furnace charge.

Dry aluminum dross in a finely divided condition presents several problems in getting it into a durable, crush-resistant, weather-resistant briquette, not adversely affected by the passage of time, i.e. possessing a reasonable life for a commercial product before use. These are attributable both to its physical condition and to the presence of certain chemical components therein. The latter are reactive with certain gases and vapors in air. The mechanism of these reactions is believed to be as follows:

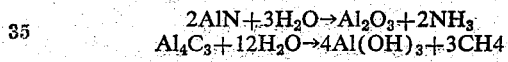

$$2AlN + 3H_2O \rightarrow Al_2O_3 + 2NH_3$$
$$Al_4C_3 + 12H_2O \rightarrow 4Al(OH)_3 + 3CH_4$$

Probably there are other reactions between some of the components of the dross and the individual gases in the atmosphere. These reactions take place under average storage conditions in warehouses in winter months as well as summer months, as borne out by disintegration of firm, hard briquettes formed from aluminum dross admixed with one of several organic binders, including coal tar pitch, under ordinary manufacture methods. When initially produced such briquettes could be shovelled, stirred around and poured from one container to another without breaking up in small pieces or finely divided particles as a result of the impact. But after storage for a week or few weeks under average warehouse conditions, the individual briquettes which had been laid upon a surface disintegrated with accompanying loss of shape; there resulted a pulverulent condition not alone on or near their surfaces but throughout the entire mass of each briquette.

Finely divided aluminum dross is obtained in the melting of metallic aluminum in which an oxidation product is formed, and then skimming this product from the melt. The product so skimmed is called "dross." Another name for it is "aluminum skimmings." In the skimming operation there is always some metallic aluminum which is incidentally taken off. The composition of aluminum dross will depend upon the skill of the operator as well as the temperature and atmosphere of the furnace and the quality-composition factor of the metallic body melted. Aluminum oxide ($Al_2O_3$) is a major component by weight present in aluminum dross and usually the major.

The metallurgical flux of this invention utilizing aluminum dross does not have the various disadvantages associated with the finely divided aluminum dross. It is a firm bonded mass that is a briquette, characterized by a durable, firm, hard structure which remains thus under warehouse and transportation conditions encountered in the extremes of summer and winter temperatures. These briquettes are approximately free from powder when initially made, and can be shovelled, poured, and subject to the usual handling operations without multiple fracturing into particles of a size which could cause an objectionable dust upon agitation or a loss of material by the force of air or oxygen when introduced into the steel making furnace. Not only are these briquettes crush-resistant and weather-resistant when initially produced, but they maintain these characteristics for six weeks up to at least a couple of months after date of manufacture without the addition of applied water-, air-impervious coating. These briquettes are not sticky and each is a separate, distinct unit. A water- and air-impervious coating can be applied, but there is no necessity of doing this insofar as the durability as a firm, hard briquette is concerned. The shelf life of these briquettes is excellent as pointed out without the expense of an additional step of coating. These and various other features of the present invention will become apparent from reading the fuller disclosure which appears below.

In accordance with the present invention dry, powdered aluminum dross, in which aluminum oxide is the major component by weight, is intimately mixed with coal tar pitch or asphalt, which pitch or asphalt becomes or is maintained liquid during this step due to applied heat, thereafter cooled somewhat, whereupon the mixture is formed into briquettes and thereafter permitted to cool to room temperature. Or if a definite shape is not desired the pressure step to attain this is simply omitted, provided the amount of the pitch or asphalt is in an upper range.

The mixing must be thorough to insure that the individual particles of the aforesaid dross are coated or encased by pitch or asphalt to prevent contact of the separate dross particles in the finished product with the atmosphere. For unless the surface of the individual dross particles are sealed off from contact with the atmosphere, not only will solid reaction products be formed in the mass but volatile gases, including ammonia and methane will form, thereby causing disruption of the firm briquette structure. As stressed, supra, raw aluminum dross is composed of very finely divided unit particles, as is borne out by the fact that if it is stirred vigorously or thrown with a shovel heavy dust formation results. Satisfactory coating of such small sized particles is dependent upon several factors. It is necessary to have an agitation of such a degree for such a period of time with the liquified pitch or asphalt that sufficient time is afforded to envelop or seal off the mass of dross particles from contact of the atmosphere with the particle surfaces. There is the factor of the proper fluidity of the coal tar pitch or asphalt during the heat mixing step, whereby a reduced viscosity is attained which enables the particles of inorganic, reactive aluminum dross to be effectively sealed off from the atmosphere. The task of enveloping or coating finely divided materials is of a different order from that of pebbles or similar sized objects. Sizes, by screen mesh of some aluminum drosses which have been made into metallurgical fluxes are as follows:

To give an appreciation of the great surface area of small particle size as compared with the size of large sand to small gravel, whereby the importance of the mixing step in the treatment of aluminum dross can be presented in bold relief, attention is called to the fact that 1 cube of 1.0 mm. length of edge has 6 mm.$^2$ total surface area, whereas cubes of 0.1 mm. length of edge made therefrom would total 1000 in number and have a total surface area of 60 mm.$^2$.

Because of the fine particle size of the aluminum dross substantially 10 to 30% of coal tar pitch based on the combined weight of the mixture is needed to satisfactorily bond these inorganic particles and so envelope them that the resulting briquettes will remain firm, durable and water- and crush-resistant over a period of several weeks and for not less than several months. The materials in the finished, cooled briquettes must remain strongly bonded; and enough of the coal tar pitch must have been used in the batch that the moisture and/or air cannot permeate the surface and underlying mass of the briquette. When such a lesser amount, as 6% of coal tar pitch is employed, the particles of aluminum dross will stick together after formation of the briquettes but the life of the briquettes is of short duration, such as approximately 7 to 20 days. This type flux product could not be shipped along hauls or kept on hand before use for several weeks without more or less deterioration manifest by softening or even crumbling taking place in the structure of the briquettes. When 10 to 30% of the pitch is employed of the total weight of the mixture the resulting briquettes have a long span of life, such as 2 months or longer. With increase in the percentage of pitch to 20% the span of life is longer than at 10% pitch, where the comparison is made using the same pitch. When approximately 25 to 30% of pitch is employed the pressure step to form briquettes can be dispensed with and the heated mass cast to a predetermined shape. In any case, each particle of powder is completely coated or enveloped in the pitch. The term "span of life" or "life" mentioned above is determined by the following three tests. When the individual briquette is subjected to the pressure applied by a man's fingers and hand it must not crumble. The next test is that such briquettes can be shovelled, poured, stirred without any significant fracturing. The third test is that they can even be dropped a distance two to six feet to the bare floor without breaking up to a significant extent into pieces having a major dimension below ⅛ of an inch.

The melting point of the coal tar pitch which is the bonding agent employed should be above the highest atmospheric and storage condition temperatures experienced in any recent years. Thus the briquettes or bonded masses are an all-season utility product. As a margin of safety for unusually high temperatures it is desirable to have a pitch which remains solid at temperatures at least as high as 122 to 135° F. The pitch should not only be solid but also non-sticky in that upper range which the briquettes or bonded masses could encounter. But its M.P. should be sufficiently low that it will fluid-

| Screen Scale | | #1 Sample | | #2 Sample | | #3 Sample | | #4 Sample | | #5 Sample | | #6 Sample | |
|---|---|---|---|---|---|---|---|---|---|---|---|---|---|
| Tyler Mesh | U. S. No. | Percent Between Sieves | Cum., Percent | Percent Between Sieves | Cum., Percent | Percent Between Sieves | Cum., Percent | Percent Between Sieves | Cum., Percent | Percent Between Sieves | Cum., Percent | Percent Between Sieves | Cum., Percent |
| 14 | 16 | .3 | .3 | .3 | .3 | .4 | .4 | .5 | .5 | .7 | .7 | .2 | .2 |
| 20 | 20 | 1.0 | 1.3 | 2.7 | 3.0 | 2.7 | 3.1 | 1.0 | 1.5 | .5 | 1.2 | .5 | .7 |
| 28 | 30 | 4.3 | 5.6 | 7.2 | 10.2 | 5.5 | 8.6 | 4.4 | 5.9 | 3.7 | 4.9 | 4.3 | 5.0 |
| 35 | 40 | 11.3 | 16.9 | 12.7 | 22.9 | 8.2 | 16.8 | 8.2 | 14.1 | 8.8 | 13.7 | 9.1 | 14.1 |
| 48 | 50 | 12.7 | 29.6 | 12.9 | 35.8 | 9.9 | 26.7 | 10.9 | 25.0 | 11.5 | 25.2 | 11.5 | 25.6 |
| 65 | 70 | 10.8 | 40.4 | 11.5 | 47.3 | 9.2 | 35.9 | 10.2 | 35.2 | 10.5 | 35.7 | 10.8 | 36.4 |
| 100 | 100 | 10.3 | 50.7 | 10.9 | 58.2 | 9.4 | 45.3 | 10.8 | 46.0 | 11.0 | 46.7 | 11.3 | 47.7 |
| 150 | 140 | 6.2 | 56.9 | 6.0 | 64.2 | 6.6 | 51.9 | 6.4 | 52.4 | 6.7 | 53.4 | 7.0 | 54.7 |
| 200 | 200 | 8.6 | 65.5 | 8.3 | 72.5 | 10.6 | 62.5 | 10.1 | 62.5 | 9.6 | 63.0 | 10.1 | 64.8 |
| Pan | Pan | 34.5 | 100.0 | 27.5 | 100.0 | 37.5 | 100.0 | 37.5 | 100.0 | 37.0 | 100.0 | 35.2 | 100.0 |

Examination establishes that more than one-third of this material is finer than 200 mesh and as a consequence a great deal of surface is exposed for a given weight.

ize to that degree which will permit it to coat the dross particles at the elevated working temperature ranges of the said coating step. The formed briquettes must not be sticky when cooled and held in stock or transported.

There are several types of coal tar pitch meeting the M.P. qualifications stated above which have been found to be satisfactory. They are listed by manufacturer's identification:

| Type of pitch: | Melting point, ° F. |
| --- | --- |
| Powdered pitch | 258–285 |
| Carbon pitch | 220–230 |
| Carbon pitch | 200–220 |
| Carbon pitch | 159–177 |
| Water-proofing pitch | 140–155 |

It is preferred to employ a pitch or asphalt of M.P. of 220–230° F. The chosen pitch may or may not be brittle at room temperatures.

Aluminum dross is a poor heat conductor. For this reason it is preferred to pre-heat it to above the M.P. of the pitch but not substantially above 700° F. before bringing it into contact with the pitch. For a pitch of M.P. 220–230° F. the pitch and the aluminum dross are heated to about 400° F. to 600° F. during the mixing step at which temperature the pitch has sufficient fluidity to coat or encase the particles of dross. The pitch can be melted before it is brought in contact with the dross. As brought out, supra, the degree of mixing must be thorough. I have found that using 10 to 15% of pitch and to 90 to 85% of aluminum dross in a batch, which pitch has an M.P. of 200–220° F., the period of mixing should be approximately one-half an hour. The time required could be as little as five minutes when the dross is heated to the higher temperature range.

During kneading of the mixture of pitch with the aluminum dross, the mixer is heated in order to lessen the viscosity of the pitch and confer the necessary plasticity to the mass. This can be accomplished by the introduction of super-heated steam into the jacket of the mixer or by the employment of other means of heating, such as gas, oil or electricity. Pitch could be added as a solid to this mixer in which alternative it would be melted therein, but it is preferred to melt the pitch in a separate vessel, preheat the aluminum dross separately, then intimately mix the aforesaid components.

What is stated above as to percentage of coal tar pitch correlated with durability of the product, the melting point ranges, and the mixing operations is equally true as to asphalt.

After the mixing step the resulting mixture is cooled to about 200° F. then compressed into briquettes by a machine; pressures of 1,000–20,000 pounds per sq. in. can be employed. The briquettes are discharged from this machine and permitted to cool to room temperature.

The following specific examples are for the purpose of illustrating the present invention and of demonstrating the advantages thereof. It must be strictly understood that this invention is not to be limited to the particular grade or type of aluminum dross nor to the particular coal tar pitch or asphalt designated, nor to that of the operations and manipulations described in these specific examples. Variations may be used, as those skilled in the art will readily understand.

*Example I*

Crushed and screened aluminum dross in the form of powder, from which metallic aluminum has been removed whereby it may contain as much as 10%, but preferably less of the free metal, is well mixed with coal tar pitch having an M.P. of 220–230° F. An amount of pitch is used which is 10% of the total weight of the mixture. The aluminum dross is pre-heated to 400–500° F. in a mixer, and the said pitch is heated to 280° F. The two are sent to another jacketed mixer and while kneading are maintained at about 250–300° F. The stirring was thorough during this step and of a duration of half an hour. The mass is then cooled to about 200° F. and then delivered to the belt of the briquette press and compressed at a pressure of 6,000 lbs. or more per sq. in. into briquettes. They were then discharged from this machine and permitted to cool to room temperature.

The briquettes produced were firm, non-sticky and possessed a rather smooth surface; they could not be broken by an individual's (man) own fingers or hands. They were further tested in two ways. A few briquette units were placed in a jar of water and held for six weeks. About nine other of these briquette units from this run were placed on a wooden board and stored in a room exposed to the atmosphere for a period of 9 weeks. At the end of six weeks the briquettes soaked in water were removed, and dried by a cloth. They were subjected to the same test as applied to the newly formed briquettes. No crumbling or fractures occurred. Each of these bricks (2 lots) was separately dropped two feet distance to a concrete floor; they did not fracture. The results were the same, establishing conclusively that for practical purposes these briquettes were very durable and were weather- and crush-resistant. The dropping test was purposely more severe as a standard than normal conditions encountered, namely rolling, pouring from bags and shovelling. But none of these three last tests applied to these two lots of briquettes resulted in chipping, fracturing or even greater disintegration of these briquettes.

*Example II*

Crushed and screened aluminum dross powder from which metallic aluminum has been removed where it may contain as much as 10% but preferably less of ore-free metal is well mixed with coal tar pitch having a melting point of 220–230° F. an amount of pitch is used which is 30% of the total weight of the mixture. The aluminum dross powder is heated to a temperature of 400 to 600° F., and thoroughly mixed with the pitch, which has been separately heated to 280° F. to liquefy it. The temperature during the kneading step is maintained at about 250–300° F. The stirring was thorough during this step and of a duration of half an hour. The heated mixture was poured into molds which conferred a shape to the bonded mass. This product was subjected to the same tests as a run of the product of Example I and satisfactorily met them. It is not necessary to press or to mold this mixture in order to have it acquire crush- and atmospheric-resistant properties. It could have simply been poured onto a horizontal concrete floor and subsequently broken up into pieces, say the approximate size of a baseball or half that size.

The uncoated metallurgical flux produced in accordance with the present invention has a much longer life when exposed to the air of wide humidity ranges and kept under various temperature ranges than uncoated fluxes made from the same powdered aluminum dross in the form of the same sized briquettes, and which fluxes utilized the same coal tar pitch or asphalt as binders but only in amounts of 5–6% by weight of the entire mixture, wherein the steps in the process are identical within commercial operating conditions.

The term "dry" in reference to "aluminum dross" means that it is free from water.

The term "briquette" is not to be construed as limited solely to a shape that is rectangular in cross section with length greater than width and depth, but includes cubes and spheres and other shapes regular or irregular of normally good strength based on configuration.

By the term "crush-resistant" in the claims and likewise in the specification unless otherwise qualified, is meant that the briquette will not crumble under pressure of the fingers of a man's own hand, and will not break by trying to break apart in a manner that people conventionally halve an apple, and can be thumped on a hard metal without fracture. By the term "weather-resistant" is meant that the briquette will not soften, lose its shape nor become disintegrated into a granular or powder condition upon standing in a room or warehouse which is not artificially dried and whose temperature resulting from exposure to the natural elements is not reduced by a refrigeration system.

I claim as my invention:

1. A briquette which is suitable as a fluxing material for fluidizing slags in the manufacture of steel in the open hearth and electric furnaces, oxygen steel furnaces and iron cupolas, which briquette is hard, non-sticky, and also weather- and crush-resistant, comprising dry, powdered aluminum dross which is mainly a mixture of aluminum oxide, metallic aluminum, aluminum carbide and aluminum nitride, the aluminum oxide being the major component by weight, mixed with a member of the group consisting of coal tar pitch and asphalt that is solid and non-sticky at atmospheric temperatures, the particles of the said dross being enveloped by it, the said member of the group consisting of pitch and asphalt being present in an amount of not less than substantially 10% and not over 30% by weight of the total weight of the briquette.

2. A briquette which is suitable as a fluxing material for fluidizing slags in the manufacture of steel in the open hearth and electric furnaces, oxygen steel furnaces and iron cupolas, which briquette is hard, non-sticky, and also weather- and crush-resistant, comprising dry, powdered aluminum dross which is mainly a mixture of aluminum oxide, metallic aluminum, aluminum carbide and aluminum nitride, the aluminum oxide being the major component by weight, mixed with a member of the group consisting of coal tar pitch and asphalt that is solid and non-sticky at atmospheric temperatures and having a melting point of 122–230° F. the particles of the said dross being enveloped by it, the said member of the group consisting of coal tar pitch and asphalt being present in an amount of not less than substantially 10% and not over 30% by weight of the total weight of the briquette.

3. A briquette which is suitable as a fluxing material for fluidizing slags in the manufacture of steel in the open hearth and electric furnaces, oxygen steel furnaces and iron cupolas, which briquette is hard, non-sticky, and also weather- and crush-resistant, comprising dry, powdered aluminum dross which is mainly a mixture of aluminum oxide, metallic aluminum, aluminum carbide and aluminum nitride, the aluminum oxide being the major component by weight, mixed with a member of the group consisting of coal tar pitch and asphalt that is solid and non-sticky at atmospheric temperatures, and having a melting point within the range 159–285° F. the particles of the said dross being enveloped by it, the said member of the group consisting of coal tar pitch and asphalt being present in an amount of not less than substantially 10% and not over 30% by weight of the total weight of the briquette.

4. A briquette which is suitable as a fluxing material for fluidizing slags in the manufacture of steel in the open hearth and electric furnaces, oxygen steel furnaces and iron cupolas, which briquette is hard, non-sticky, and also weather- and crush-resistant, comprising dry, powdered aluminum dross which is mainly a mixture of aluminum oxide, metallic aluminum, aluminum carbide and aluminum nitride, the aluminum oxide being the major component by weight, mixed with a member of the group consisting of coal tar pitch and asphalt that is solid and non-sticky at atmospheric temperatures, and having a melting point within the range of approximately 220–230° F. the particles of the said dross being enveloped by it, the member of the group consisting of coal tar pitch and asphalt being present in an amount of not less than substantially 10% and not over 30% by weight of the total weight of the briquette.

References Cited in the file of this patent

UNITED STATES PATENTS

| | | |
|---|---|---|
| 2,416,179 | Kemmer | Feb. 18, 1947 |
| 2,478,345 | Vance | Aug. 9, 1949 |

FOREIGN PATENTS

| | | |
|---|---|---|
| 126,046 | Great Britain | May 8, 1919 |